United States Patent
Bunschoten et al.

[19]

[11] Patent Number: 6,155,459
[45] Date of Patent: Dec. 5, 2000

[54] SPRAY DISPENSER

[75] Inventors: Gerrit Klaas Bunschoten; Norman Jason Pritchard, both of Maarssen, Netherlands

[73] Assignee: Diversey Lever, Inc., Plymouth, Mich.

[21] Appl. No.: 09/196,822

[22] Filed: Nov. 20, 1998

[30] Foreign Application Priority Data

Dec. 15, 1997 [EP] European Pat. Off. .............. 97203930

[51] Int. Cl.$^7$ ....................................... B67D 5/60
[52] U.S. Cl. ................... 222/136; 222/207; 222/383.1
[58] Field of Search ................... 222/129, 145.1, 222/136, 383.1, 207, 211, 212, 209

[56] References Cited

U.S. PATENT DOCUMENTS

| | | | |
|---|---|---|---|
| 4,201,316 | 5/1980 | Klingaman . | |
| 4,355,739 | 10/1982 | Vierkotter | 222/136 |
| 4,790,454 | 12/1988 | Clark et al. | 222/136 |
| 5,529,216 | 6/1996 | Kilma et al. . | |
| 5,711,457 | 1/1998 | Wanbaugh et al. | 222/136 |
| 5,964,377 | 10/1999 | Demarest et al. | 222/383.1 |

FOREIGN PATENT DOCUMENTS

| | | |
|---|---|---|
| 606 672 | 11/1993 | European Pat. Off. . |
| 30 25 355 | 7/1980 | Germany . |
| 35 35 986 | 10/1985 | Germany . |
| 2 310 149 | 2/1996 | United Kingdom . |

Primary Examiner—Philippe Derakshani

[57] ABSTRACT

The invention relates to a device for dosing a predetermined amount of concentrate into a spray dispenser, said device being insertable between a spray head and the spray dispenser, the device comprising:

a reservoir chamber for storing a predetermined amount of concentrate;

a dosing chamber associated with said reservoir chamber, wherein concentrate is transferable into the dosing chamber from the reservoir chamber, said dosing chamber having such a form as to be able to dose a predetermined amount of concentrate into the spray dispenser.

14 Claims, 3 Drawing Sheets

SPRAY DISPENSER

FIELD OF THE INVENTION

The present invention relates to a device for dosing a predetermined amount of concentrate into a spray dispenser, to a spray assembly comprising such a device and to a method for dosing a liquid concentrate into a dispenser.

BACKGROUND OF THE INVENTION

The use of manually operable spray containers, especially spray bottles, for dispensing reagents such as water, detergent cleaners, de-icers, insecticides and the like, as an alternative to environmentally harmful aerosols, are well known.

The most spray dispenser bottles currently on the market, are pre-filled with a chemical reagent and sold ready to use.

Once the contents of these spray dispenser bottles have been used up, these spray dispenser bottles are often thrown away despite the fact that they mostly remain fully functional.

Devices insertable between a spray head and a dispenser container are known, and are described in U.S. Pat. No. 5,529,216, EP-A-0 606 672, and DE-35 35986 for example.

Although these devices and systems are functional, they are awkward to operate. Furthermore operation of these devices often leads to overdosing of the concentrate, and an uneconomical operation.

It is an object of the present invention to provide an improved device for dosing concentrate into a spray dispenser.

DEFINITION OF THE INVENTION

According to a first aspect of the present invention, there is provided a device for dosing a predetermined amount of concentrate into a spray dispenser, said device being insertable between a spray head and the spray dispenser, the device comprising:

a reservoir chamber for storing a predetermined amount of concentrate;

a dosing chamber associated with said reservoir chamber, wherein concentrate is transferable into the dosing chamber from the reservoir chamber, said dosing chamber having such a form as to be able to dose a predetermined amount of concentrate into the spray dispenser.

According to a second aspect of the present invention there is provided an assembly comprising a spray head, a device according to the above, and a container, preferably being a spray dispenser bottle.

According to a third aspect of the present invention there is provided a process for dosing a predetermined amount of concentrate into a spray dispenser comprising the steps of:

arranging the device above between a spray dispenser head and a spray dispenser container;

displacing the reservoir with respect to the dosing chamber so that concentrate flows from the reservoir into the dosing chamber; and/or displacing the reservoir with respect to the dosing chamber so that the concentrate flows from the dosing chamber into the spray bottle.

DETAILED DESCRIPTION OF THE INVENTION

The device of the present invention enables a user to transfer a predetermined amount of concentrate from the reservoir chamber into the dosing chamber, wherefrom this concentrate is dosed, when desired, into the dispenser in order to mix with the liquid therein to provide a use solution.

Accordingly, the concentration of the use solution can be adjusted when required and furthermore, when the use solution is finished, the dispenser is merely refilled with liquid, such as water, whereafter concentrate can be dosed therein by the device.

The dosing chamber is preferably transformable in shape between a first volume and a second volume, wherein the first volume is greater than the second volume, and most preferably, the dosing chamber has a concertina like form in order to efficiently dose a desired amount of concentrate into the dispenser.

The reservoir chamber is preferably displaceable with respect to the dosing chamber in order to transform said dosing chamber between its first and second volume shapes. In order to accurately control the transfer of concentrate between the reservoir chamber and the dosing chamber, valve means can be arranged therebetween.

The reservoir chamber and dosing chamber are preferably housed within a first and second housing part, wherein the first housing part is cooperable with the second housing part, and wherein the first housing part is preferably displaceable with respect to the second housing part in order to effect efficient dosing.

The second housing part is preferably releasably lockable within the first housing part in order to provide extra user control and further prevent over-dosing.

The first housing part is preferably releasably securable to a neck of a spray head and the second housing part is preferably releasably securable to a neck of a dispenser, in order to provide good utility.

The dosing chamber furthermore preferably comprises valve means for controlling the transfer of concentrate into the spray dispenser therefrom.

In order to further prevent overdosing of the concentrate, the device may comprise securing means for securing the dosing chamber in its second volume shape.

The invention will now be further clarified by way of the following specific description with reference to the accompanying drawings, wherein.

Figure 1:
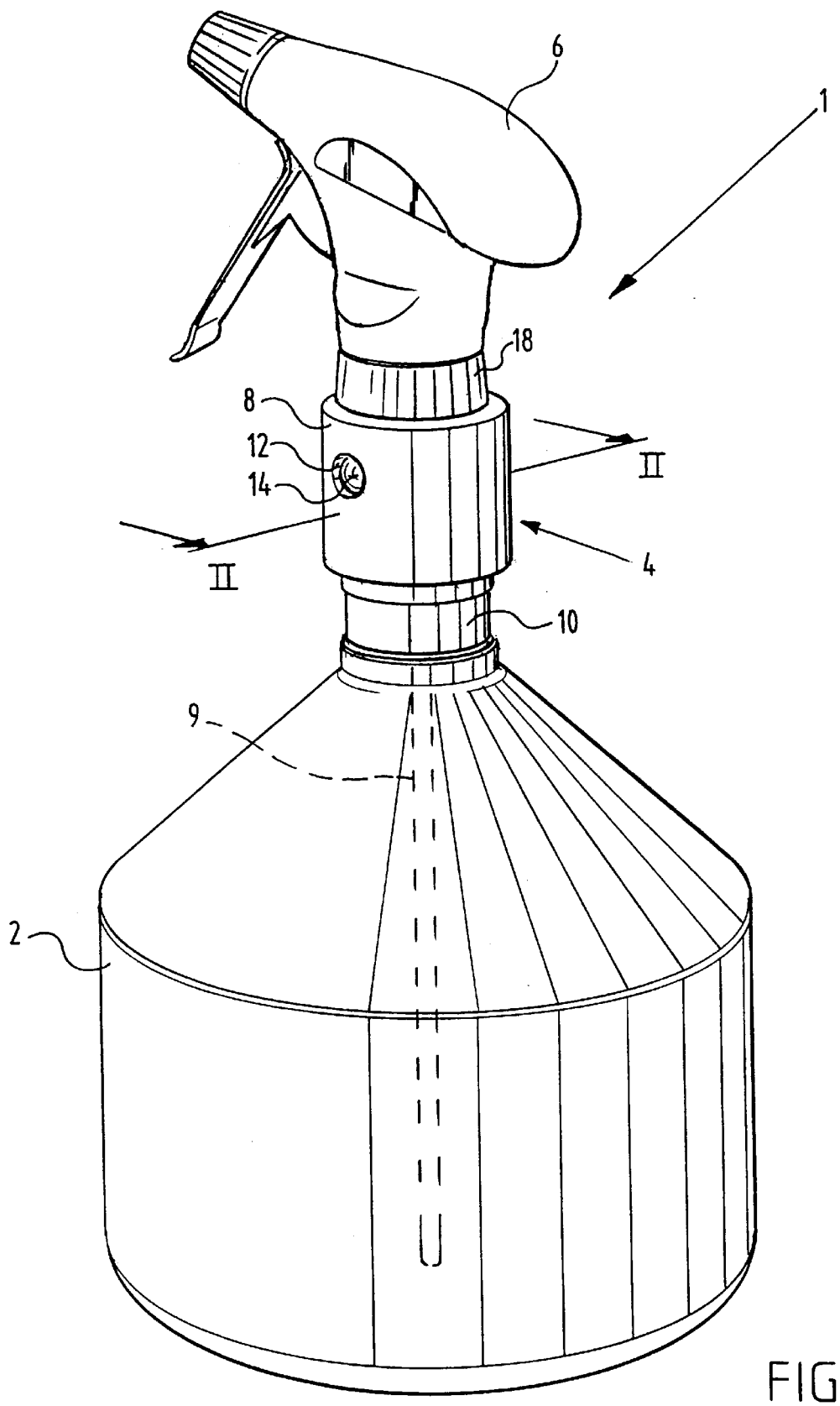
FIG. 1 shows a perspective view of a preferred embodiment of an assembly according to the present invention.

An assembly 1 (FIG. 1) comprises a spray bottle dispenser 2, a device 4 in the form of a "pump action cartridge" and a spray head 6 having a down tube 9 connected thereto which extends through the cartridge 4 and into the bottle 2. The cartridge 4 comprises a first housing part 8 and a second housing part 10. The first housing part 8 is provided with oppositely arranged circular openings 12 and 13 which co-operate with a locking stub 14 of the second housing part 10 (see further FIGS. 2–4). A "screw" thread 50 is arranged on the inner surface of the first housing part 8 between the openings 12, 13.

Figure 3:
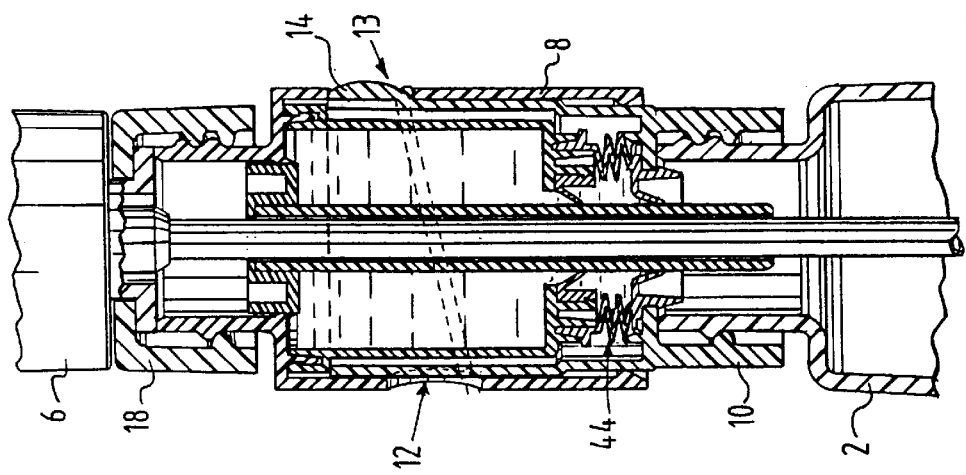
FIGS. 2–3 show cut away exploded side views through section II—II of FIG. 1, of a preferred embodiment of a device according to the present invention in working.
Figure 2:
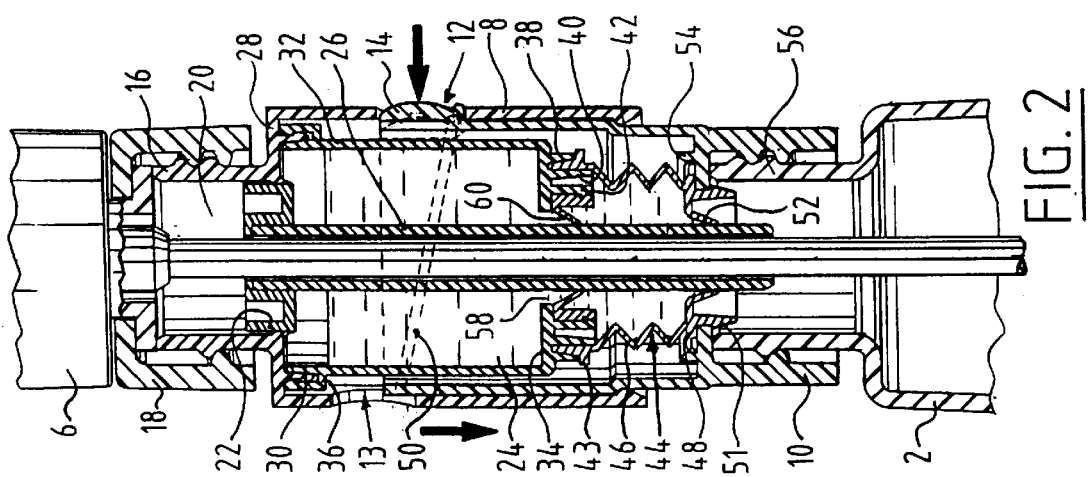

An upstanding neck part 16 of the first housing part 8 is screwably locked into a cap 18 of the spray head 6, see FIGS. 2 and 3.

A ring section 20 is provided within the neck 16 of the housing 8 wherethrough the down tube 9 extends. At the lower side thereof, the ring section 20 contacts two U-elements in cross-section 22, which together with shoulders 28 of the neck 16 form an upper wall of a reservoir chamber 24 (FIG. 2).

The reservoir chamber 24 is defined by an inner wall 26 extending from the elements 22 downwardly along the down tube 9, side walls 32 extending downwardly to terminate in a reservoir lower wall 34 wherein the side wall 32 are provided at the top end thereof with an outstanding L-section in cross-section 36 which cooperates with depending rim 30 of the outer housing 8.

The lower wall 34 is provided with three extending lips, respectively 38, 40 and 42. The lips 38 and 40 extend from the lower wall 34 to enclose an upstanding rim part 43 of a dosing chamber 44.

An opening 58 is provided in the lower wall 34 of the reservoir 24 next to the inner wall 26 thereof. Valves 60 are arranged between the reservoir 24 and the dosing chamber 44.

The dosing chamber 44 has side walls 46 comprising a plurality of sections foldable like a concertina.

A lower wall 48 of the dosing chamber comprises a locking inverted L-shaped in cross-section rim 51 and valves 52. Lying L-sections in cross-section 54 of the second housing 10 interlock with the lower wall 48 of the dosing chamber 44.

The second housing part 10 is screwed onto an upstanding neck 56 of the dispenser bottle 2.

The reservoir chamber can typically have a capacity of 20–200 ml depending on the type of application whilst the dosing chamber can typically have a capacity of 1–10 ml. It will of course be clear that the device can be produced to yield different capacities of the reservoir and dosing chamber in order to meet client's wishes.

Figure 4:
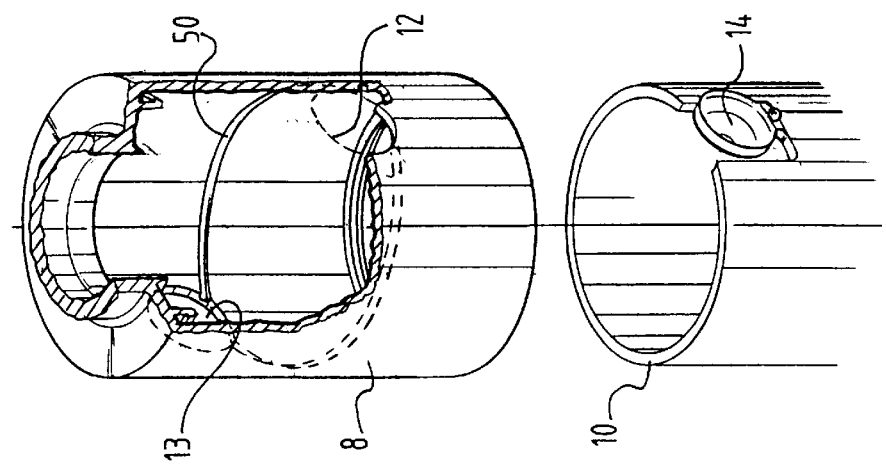
FIG. 4 shows a partially cut-away perspective view of part of the embodiment from FIGS. 2, 3.

After having arranged the device 4 between the spray head 6 and the bottle 2 for the first time (FIG. 2), the spray head 6 and outer housing 8 can be pushed downwards and rotated about the inner housing 10, by first releasing the locking stub 14 from the opening 12 of the outer housing 8 (FIG. 2) and subsequently rotateably screwing the outer housing 8 downwards, whereby thread 50 follows the stub 14, so that the latter locks into opening 13, FIGS. 3, 4. On doing so, the reservoir 24 is pushed down which in turn concertinas the dosing chamber 44, whereby the first housing 8 slides down over the sidewalls of the second housing 10 so that L-section 36 of the reservoir chamber 24 comes to rest on the side wall 32 of the second housing part 10 where by the dosing chamber achieves its fully folded form (see FIG. 3). When using the device for the first time in this manner, the dosing chamber 44 will be empty unless the dosing chamber is pre-filled ready for sale and use, as is preferably the case.

In order to fill the dosing chamber, stub 14 is pushed inwards and released from opening 13, whereafter the outer housing 8 and reservoir 24, are pulled upwards by the user, the first housing 8 being rotated about the second housing 10 by means of thread So following stub 14 thereby unfolding the walls of the dosing chamber whereby valves 60 open to allow passage of concentrate in the reservoir chamber 24 to flow into the opening dosing chamber 44. Upward movement of the outer housing 8 and the reservoir 24 is stopped when the locking stub 14 of the inner housing 10 positions itself again in the opening 12 of the housing 8 to lock itself therein. In this state the dosing chamber 44 is filled with concentrate.

In order to dose the contents of the dosing chamber into the bottle, the housing 8 and reservoir chamber are once again pushed down, whereby the dosing chamber folds down to expel the concentrate out through the valves 52 of the dosing chamber and into the bottle. Since dosage is carefully controlled and the dosing chamber is "locked" in its compressed state, from where it must be physically released before any further dossage is possible, overdosing of the concentrate is prevented.

Figure 7:
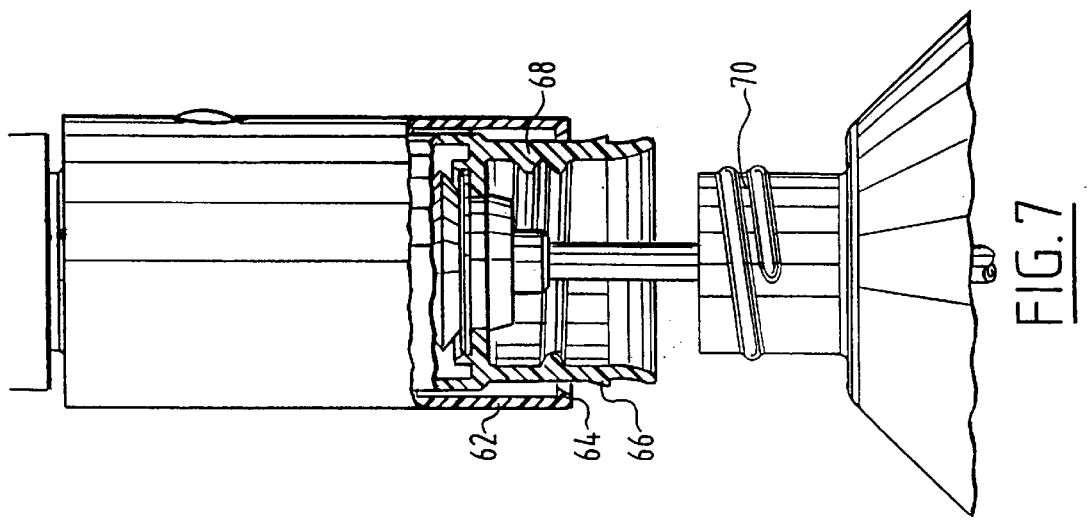
FIGS. 5–7 show a partially cut-away exploded side views of a further embodiment of a device according to the present invention.
Figure 6:
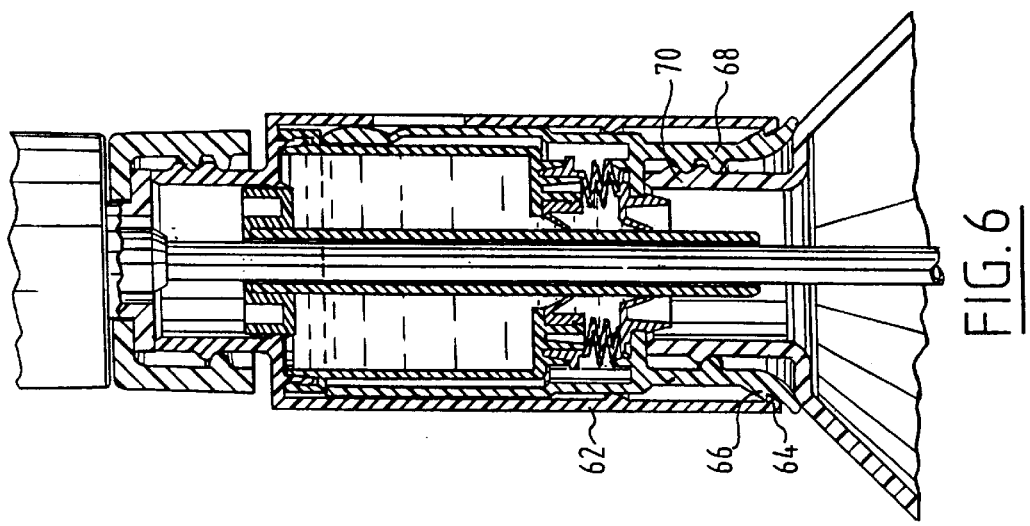
Figure 5:
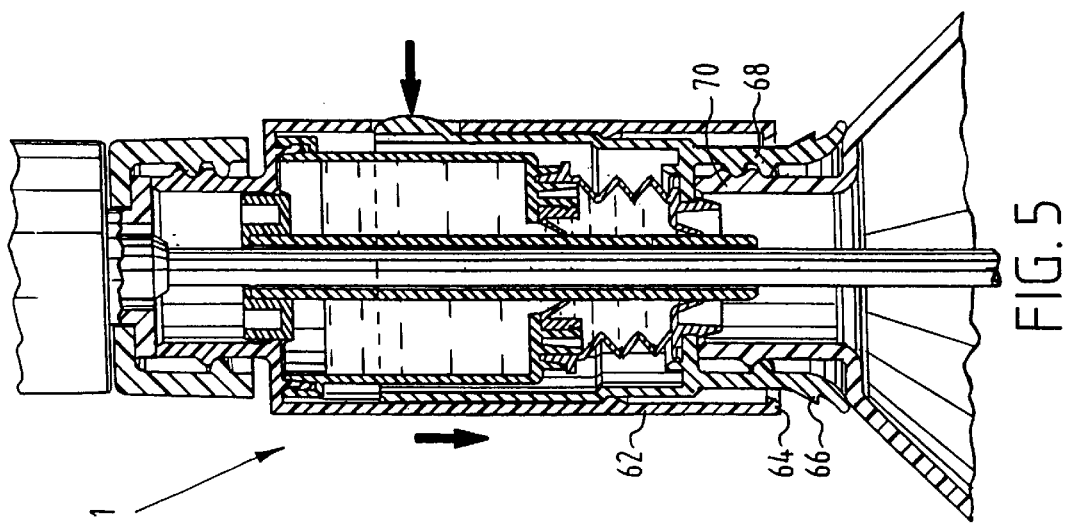

The solution in the bottle itself can be sprayed in the normal manner by operating the spray head 6. In a second embodiment 60 (FIGS. 5–7) of the device according to the present invention the outer housing 62 is locked in a dosing state, FIG. 6, wherein the dosing chamber is compressed, by means of firstly releasing the locking stub in the outer housing opening, and then simply pushing the outer housing 62 over the inner housing so that a locking lip 64 on the under side of the outer housing 62 is moved over and locked under a locking rim 66 associated with the inner housing 68, see FIG. 6. In order to release the outer housing from this position, the outer housing and the inner housing must firstly be screwed off of the neck of the dispenser bottle, as shown in FIG. 7 whereby the locking lip 64 is released from its locked position (FIG. 6), since the inner housing 68 shrinks to its normal size on release from the dispenser neck 70. Accordingly overdosing of the concentrate is prevented since in order to discharge the dosing chamber, the device 60 must firstly be removed from the dispenser bottle. In order to re-dose concentrate into the bottle, the above steps need merely be repeated.

The invention is not limited to the above described preferred embodiments, the requested rights are rather determined by the following claims.

What is claimed is:

1. Device for dosing a predetermined amount of concentrate into a spray dispenser, said device being insertable between a spray head and the spray dispenser, the device comprising:

a reservoir chamber for storing a predetermined amount of concentrate;

a dosing chamber associated with said reservoir chamber, wherein concentrate is transferable into the dosing chamber from the reservoir chamber, said dosing chamber having such a form as to be able to dose a predetermined amount of concentrate into the spray dispenser, wherein the dosing chamber is transformable in shape between a first volume and a second volume, the first volume being greater than the second volume.

2. Device according to claim 1, wherein the dosing chamber has a concertina like form.

3. Device according to claim 1, wherein the reservoir chamber is displaceable with respect to the dosing chamber.

4. Device according to claim 1, wherein the dosing chamber and the reservoir chamber are separated by displaceable valve means, displaceable between an open position wherein transfer of concentrate between the reservoir chamber and the dosing chamber is allowable, and a closed position wherein transfer of concentrate between the two chambers is cut off.

5. Device according to claim 4, wherein the chambers are lockable in the closed position.

6. Device according to claim 1, comprising a first housing part co-operable with a second housing part.

7. Device according to claim 6, wherein the first housing part is displaceable with respect to the second housing part.

8. Device according to claim 6, wherein the second housing part is releasably lockable within the first housing part.

9. Device according to claim 8, wherein the first housing part is releasably securable to a neck of a spray head and wherein the second housing part is releasably securable to a neck of a spray dispenser.

10. Device according to claim 1, wherein the dosing chamber further comprises valve means for controlling the transfer of concentrate into the spray dispenser from the dosing chamber.

11. Device according to claim 1 furthermore comprising securing means for securing the dosing chamber in its second volume shape.

12. Assembly comprising a spray head, a device according to claim 1, and a container, preferably being a spray dispenser bottle.

13. Assembly according to claim 12 wherein the container comprises more than one neck-like opening wherein the device is insertable.

14. Process for repeatedly dosing a predetermined amount of concentrate into a spray dispenser, comprising the steps of:

arranging a device according to claim 1 between a spray dispenser head and a spray dispenser container; and i) displacing the reservoir with respect to the dosing chamber so that the concentrate flows form the reservoir into the dosing chamber, or ii) displacing the reservoir with respect to the dosing chamber so that the concentrate flows form the dosing chamber into the spray bottle, or iii) both.

* * * * *